Inventor:
Theodor A. Buchhold,

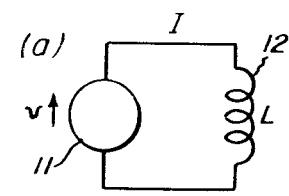
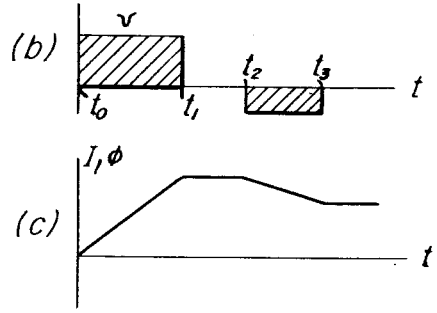
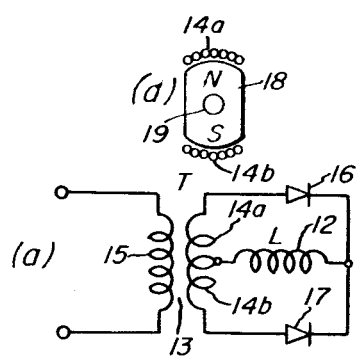
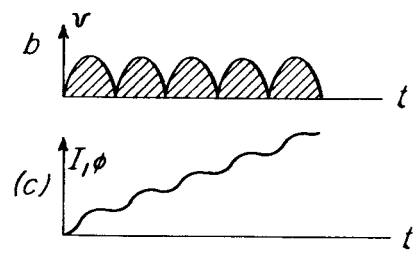
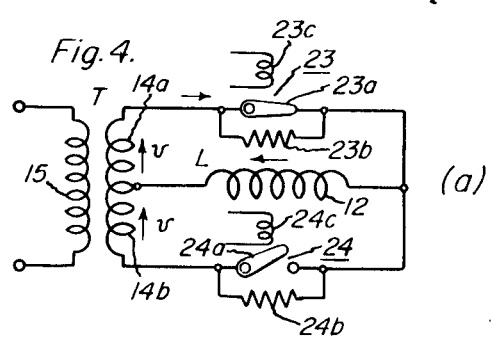
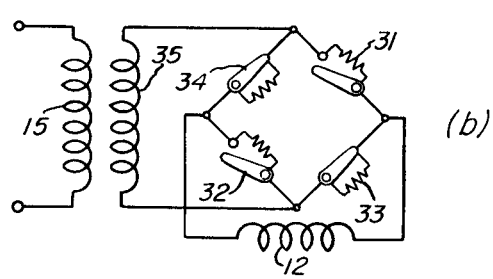
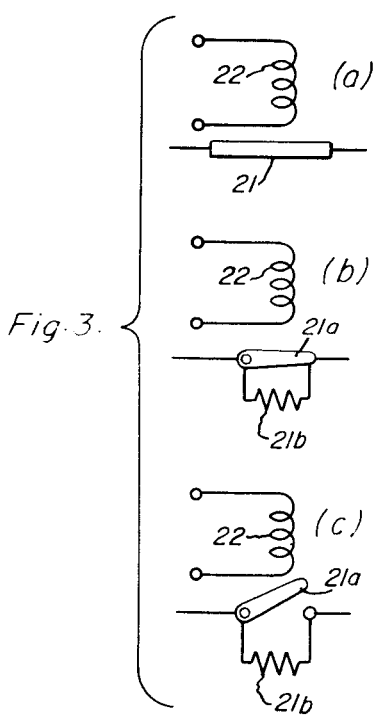
Inventor:
Theodor A. Buchhold,
by
His Attorney.

Fig. 14.
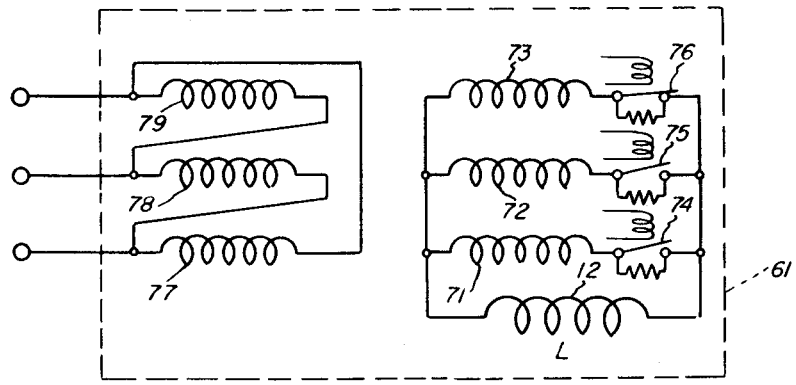
Fig. 7.
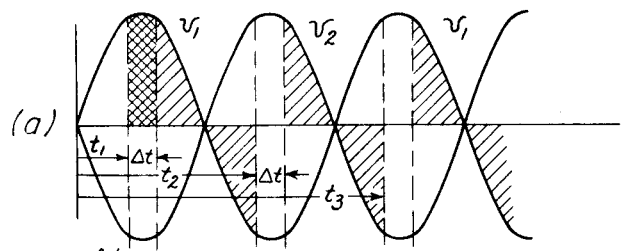
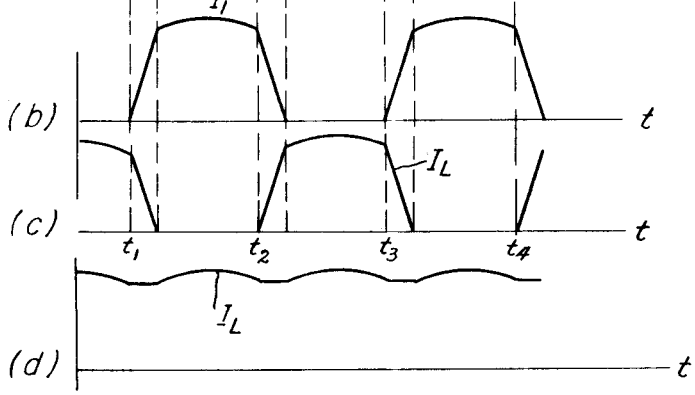
Inventor:
Theodor A. Buchhold,

Inventor:
Theodor A. Buchhold,
by [signature]
His Attorney.

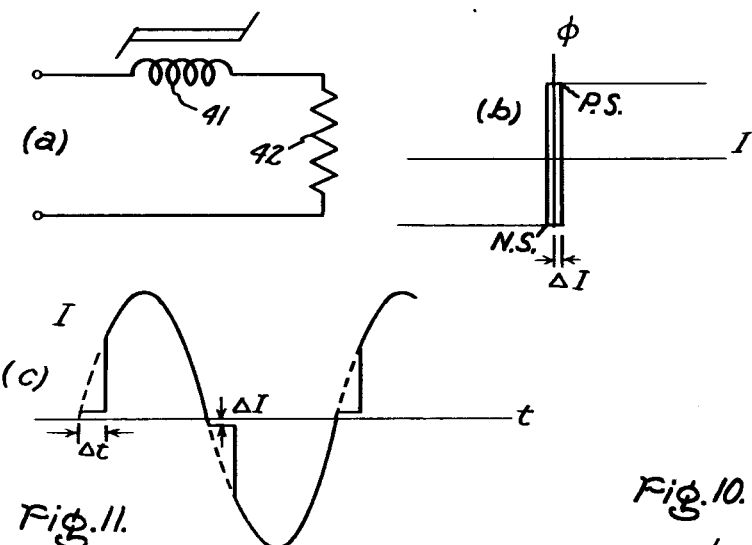
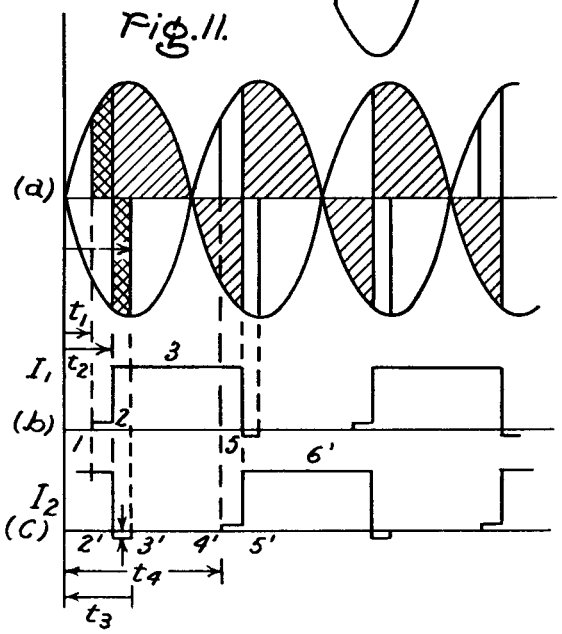
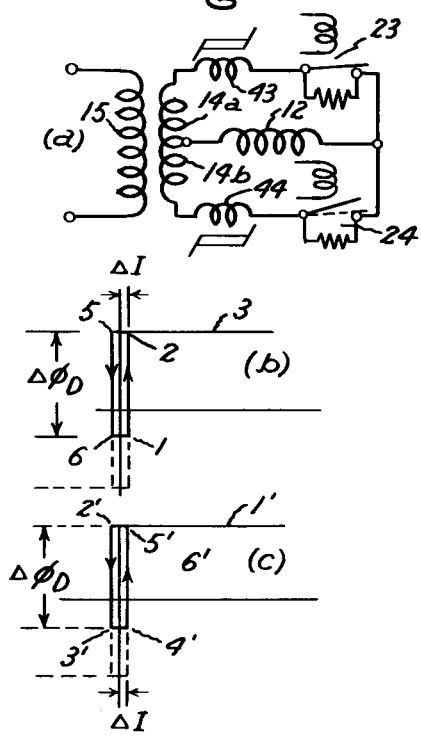

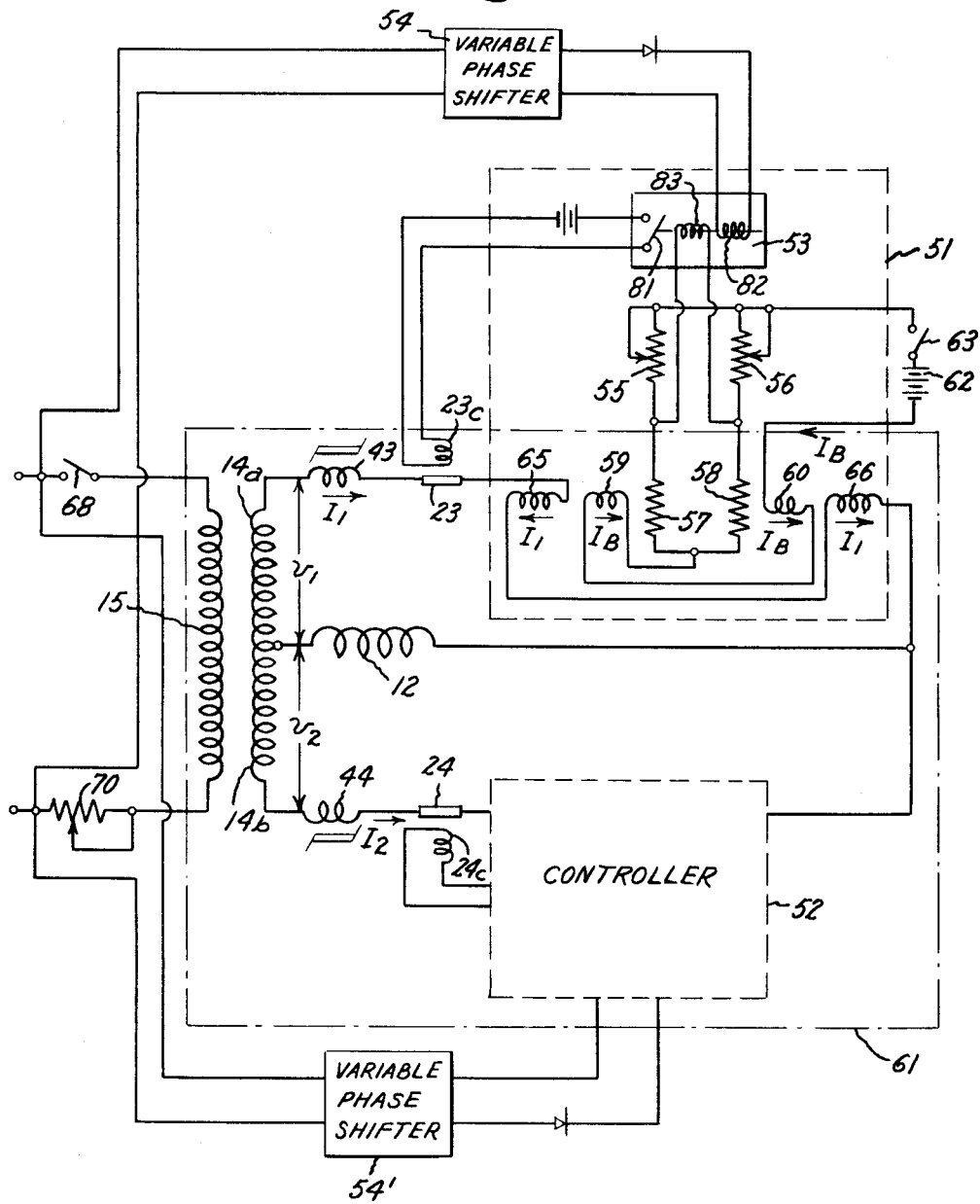

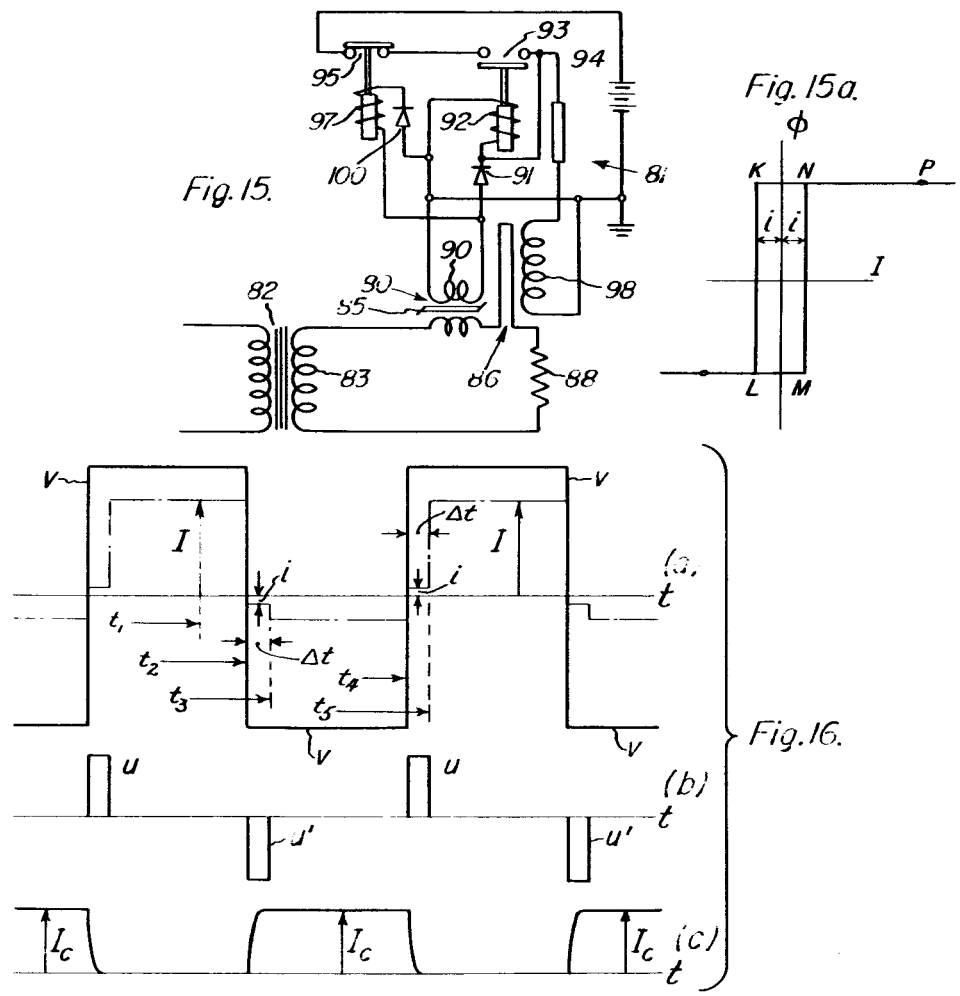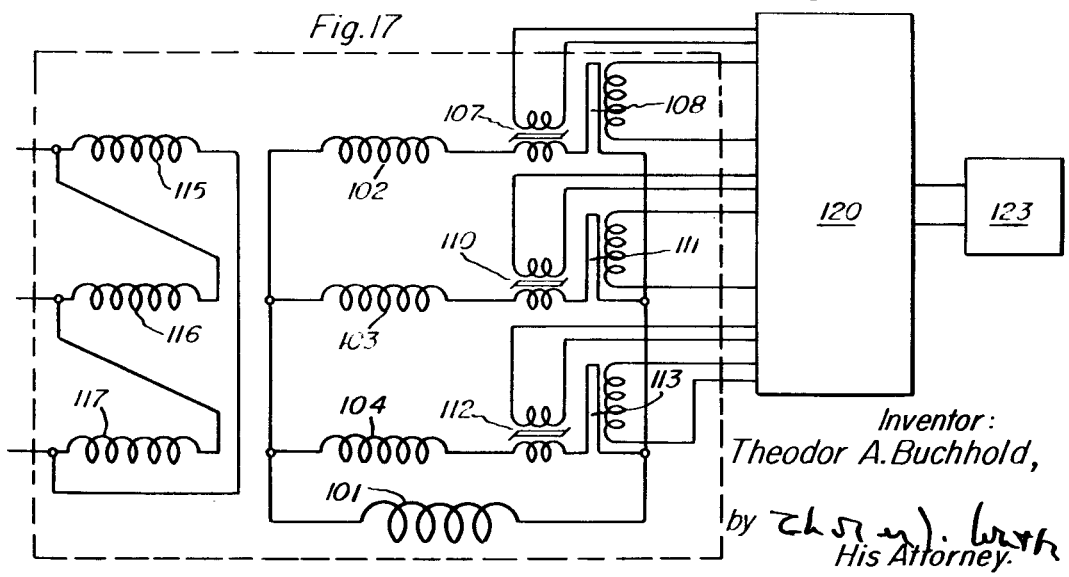

Inventor:
Theodor A. Buchhold,
by
His Attorney.

United States Patent Office

3,356,924
Patented Dec. 5, 1967

---

3,356,924
CRYOGENIC PUMPED RECTIFIER SYSTEMS
Theodor A. Buchhold, Schenectady, N.Y., assignor to General Electric Company, a corporation of New York
Filed May 2, 1967, Ser. No. 642,625
7 Claims. (Cl. 321—8)

ABSTRACT OF THE DISCLOSURE

In this apparatus, heavy currents for flux production are built up over a period of operating time in a superconducting coil where losses are substantially zero, suitably by using a small A.C. supply current source. Alternate lossless superconducting paths alternately couple the A.C. source with the coil through cryotron or electromechanical switches controlled by saturable reactors, disconnection of such a path consequently being substantially simultaneous with reversal of current flow through that path.

---

This is a continuation-in-part of my copending application, Ser. No. 353,667, filed Mar. 23, 1964, and assigned to the assignee hereof, which is in turn a continuation-in-part of my copending application, Ser. No. 284,246, filed May 29, 1963, and assigned to the assignee hereof, and now abandoned.

The present invention relates to a new electric cryogenic flux pumping arrangement and to novel electrical control apparatus having special utility therein.

The field of cryogenics relates to the application of superconduction in devices maintained at low temperature environments in the neighborhood of 0–15° Kelvin.

In recent years, great emphasis has been given to superconductive coils such as those made of Nb-Zr and $Nb_3Sn$, which produce very high fields without losses. Such coils at present are made of thin wires (e.g., 10 mil) or of thin stranded cables, and may be used in such devices as particle accelerators, or magnetohydrodynamic generators to produce large magnetic flux fields. However, if the coils become larger, the wire length becomes larger and very high voltages are induced if such a coil becomes normal. Furthermore, the forces in such larger coils become enormous. For these reasons, such larger coils are not reliable. Therefore, the development has tended toward fabrication of the coils from wires having larger cross sections, or from ribbons which means larger currents (e.g., several thousand amperes). This requirement in turn produces severe problems in bringing such heavy currents from the normal temperature to the low temperature without having too large a heat influx. In order to overcome this difficulty, the present invention was devised.

It is therefore a primary object of the present invention to provide a new electric flux pumping arrangement for supplying circulating electric current of any desired magnitude to a superconducting lossless component such as a coil included in a superconducting lossless closed circuit.

A primary operating advantage made possible by the new electric flux pumping arrangement is that the heavy currents for flux production stay always inside the low temperature superconducting environment where losses are substantially zero, and only small supply currents need be fed to the arrangement.

Another operating advantage of the novel flux pumping arrangement is that if flux pumping is stopped, a circulating current of constant magnitude is permanently frozen into the superconducting coil or other lossless component being energized.

Still another advantage of the invention is that the circulating current through the superconducting coil, and hence flux produced by the coil, can be readily increased, or decreased, or maintained at a desired constant value within the design limitations of the system.

A further advantage of the invention is that only a small flux pumping arrangement is required to obtain a very large superconducting circulating current, and hence a large amount of magnetic flux, if the charging time for charging the superconducting coil to a desired flux level is long enough.

A still further operating advantage of the present invention is that variations in the supply voltage to the novel flux pumping arrangement do not impair its operation.

Still another important advantage of the invention is that the efficiency during flux pumping is very high so that only small amounts of liquid helium are evaporated in maintaining the cryogenic environment.

In practicing the invention, a flux pumping arrangement is provided which includes a superconducting component and a superconducting lossless source of varying electric potential. Alternate lossless superconducting paths are provided for alternately coupling the superconducting lossless source of varying electric potential in electric circuit relationship with the superconducting component. The arrangement is completed by properly controlled switching means which are connected in each of the alternate superconducting paths for alternately switching the superconducting source of varying electric potential in and out of the electric circuit relationship with the superconducting component through alternate ones of the superconducting paths in proper phase relationship with the varying electric potential supplied from the lossless superconducting source. The switching means are controlled by special sensing devices which assure that the switching off occurs at current zero.

In operation, the flux pumping arrangement described above produces a current flow of a controllable magnitude through the superconductive lossless component by alternately connecting the lossless source of varying electric potential across the lossless superconducting component through one of the lossless superconducting paths upon the varying electric potential of the lossless source measured with respect to one of the superconducting paths attaining a predetermined phase relation whereby current is induced to flow through the one superconducting path and through the lossless superconducting component in a given direction. The lossless source of varying potential is then alternately connected across the lossless superconducting component through an alternate lossless superconducting path upon the varying electric potential from the lossless source measured with respect to the alternate superconducting path attaining a predetermined phase relation relative to the potential measured with respect to the one superconducting path whereby current is induced to flow through the alternate superconducting path and through the lossless superconducting component in the same given direction. The one superconducting path is then alternately effectively disconnected from the lossless superconducting component upon the connection of the alternate superconducting path to that component, such disconnection being substantially simultaneous with the reversal of current flow through such one superconducting path. And the alternate superconducting path is alternately effectively disconnected from the lossless superconducting component upon the alternate connection of the one superconducting path to the lossless superconducting component upon the varying electric potential measured with respect to the one superconducting path attaining a predetermined phase relation relative to the potential measured with respect to the alternate superconducting path, such effective disconnection being substantially simultaneous with reversal of current flow through such alternate superconducting path.

As indicated above and described in more detail below, the flux pumping arrangement of this invention incorporates novel electrical control apparatus. In fact, but for this unique apparatus, important advantages of this flux pumping apparatus could not be obtained. Moreover, this new tool holds the possibility of utility in other electrical devices and systems, being capable of performing the functions of a controlled rectifier such as a thyratron or a silicon controlled rectifier and having the advantages that it is operative at cryogenic temperatures and that in the forward direction has zero resistance. Broadly described, this new tool comprises a power cryotron, switch means to connect power cryotron to a power source and means connecting the switch means to an alternating current source. The switch means will preferably take the form of a fractional wave rectifier, suitably a half-wave rectifier, while the connecting means will preferably be a saturable reactor or a saturating transformer. This subcombination of the apparatus of this invention is for convenience sometimes hereinafter referred to as a "reactor cryotron."

While the reactor cryotron may take various forms, depending upon the purposes and objectives in any particular instance, it provides in the embodiments illustrated and described herein a short-time interval which is vitally necessary to allow the cryotron component to change from the resistive to the superconducting state. It also performs the important function of producing a signal when the current tends to become negative to make the cryotron resistive.

Other objects, features and many of the attendant advantages of this invention will be appreciated more readily as the same becomes better understood by reference to the following detailed description when considered in connection with the accompanying drawings, wherein like parts in each of the several figures are identified by the same reference character, and wherein:

FIGURE 1(a) is a schematic circuit diagram of a simple lossless circuit which illustrates the principles of flux pumping;

FIGURE 1(b) is an assumed voltage magnitude vs. time characteristic curve of a voltage source incorporated in the circuit of FIGURE 1(a);

FIGURE 1(c) is an assumed current magnitude vs. time characteristic curve for the current flowing in the circuit of FIGURE 1(a);

FIGURE 2(a) is a schematic circuit diagram of a transformer supplied flux pumping arrangement employing idealized rectifiers, and illustrates the principles of the present invention;

FIGURE 2(b) is a voltage magnitude vs. time characteristic curve showing one operating characteristic of the circuit of FIGURE 2(a);

FIGURE 2(c) is a current magnitude vs. time characteristic curve of the circuit of FIGURE 2(a);

FIGURE 2(d) illustrates an alternative source of lossless varying potential for use with the circuit arrangement shown in FIGURE 2(a);

FIGURE 3(a) is a schematic illustration of a superconducting cryotron;

FIGURE 3(b) is an alternative schematic illustration of a superconducting cryotron showing the cryotron in its "on" condition;

FIGURE 3(c) is a schematic illustration showing the cryotron in its "off" condition;

FIGURE 4(a) is a schematic circuit diagram of a practical single phase electric flux pumping arrangement which employs power cryotrons to accomplish power switching, and which is constructed in accordance with the present invention;

FIGURE 4(b) is an alternative form of a practical, single phase flux pumping arrangement that uses power switching cryotrons, and is constructed in accordance with the present invention;

FIGURE 7 is a series of voltage vs. time and current vs. time characteristic curves for the circuit of FIGURE 4(a), and illustrates the mode of operation of same to maintain constant current through the lossless superconducting coil being supplied;

FIGURE 9(a) is a simple series circuit incorporating a saturable reactor connected in series with a resistor;

FIGURE 9(b) is a hysteresis curve for a conventional saturable reactor such as that employed in the circuit of FIGURE 9(a);

FIGURE 9(c) is a sine wave characteristic curve illustrating the effect of the saturable reactor on a sine wave supplied to the circuit shown in FIGURE 9(a);

FIGURE 10(a) is a modified form of the circuit of FIGURE 4(a) which includes a superconducting saturable reactor connected in each of the alternate superconducting lossless paths or branches of the arrangement of FIGURE 4(a);

FIGURE 10(b) is a hysteresis curve illustrating the mode of operation of the saturable reactor in one path of the circuit in FIGURE 10(a);

FIGURE 10(c) is a second hysteresis curve illustrating the mode of operation of the saturable reactor connected in the alternative path of the circuit in FIGURE 10(a);

FIGURE 11 is a series of voltage vs. time and current vs. time characteristic curves illustrating the mode of operation of the circuit of FIGURE 10(a);

FIGURE 12 is a schematic circuit diagram of a complete electric flux pumping arrangement constructed in accordance with the invention, and illustrates the nature of the sensing and control circuits required to be used in conjunction with the flux pumping circuits to accomplish electric flux pumping in accordance with the invention;

FIGURE 14 is a schematic circuit diagram of a three-phase flux pumping arrangement constructed in accordance with the present invention;

FIGURE 15 is a schematic diagram of a half-wave rectifier circuit incorporating the reactor cryotron of this invention in a preferred embodiment;

FIGURE 16(a) is a chart on which current is plotted against time to produce a curve representing the mode of operation of the circuit of FIGURE 15;

FIGURE 16(b) is another chart on which voltage is plotted against time to illustrate the action occurring in the secondary winding of the saturable reactor of the circuit of FIGURE 15 at spaced intervals corresponding to the changes in voltage depicted in 16(a);

FIGURE 16(c) is still another chart on which current is plotted against time to depict current flows to the coil of the cryotron control element; and FIGURE 17 is a schematic circuit diagram of a three-phase flux pumping arrangement constructed in accordance with the present invention;

Figures 5, 6:
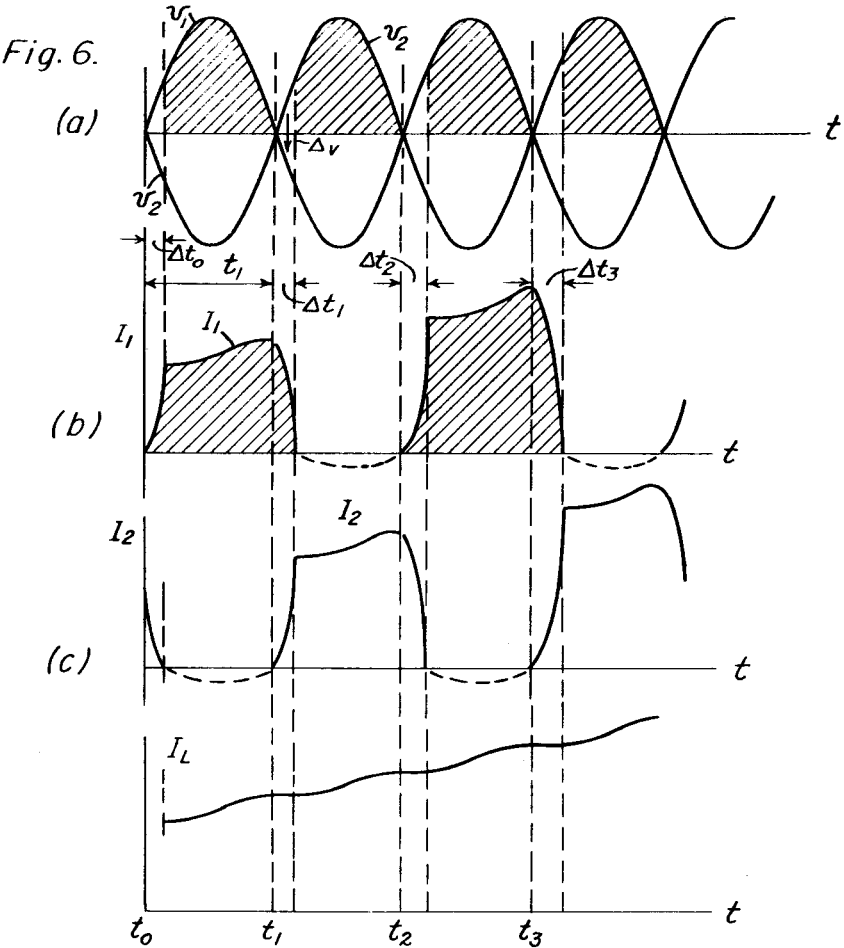
FIGURE 5 is a schematic circuit diagram of a flux pumping arrangement similar to that of FIGURE 4(a), but is modified to illustrate the effect of leakage inductance present in the circuit.
FIGURE 6 is a series of voltage vs. time and current vs. time characteristic curves illustrating one mode of operation of the flux pumping arrangement of FIGURE 4(a), and shows the manner of operating the same for increasing current through the lossless coil being supplied.

FIGURE 1 of the drawings is a schematic circuit diagram of a simple lossless superconducting circuit comprised by a generator 11 which is assumed to be superconducting and lossless, and a superconducting lossless coil 12 which is coupled across the lossless generator 11. For the purpose of illustration, it is assumed that the generator 11 develops an output voltage $v$ having a voltage magnitude vs. time characteristic wave shape such as that shown in FIGURE 1(b) of the drawings. Upon the voltage $v$ from generator 11 being applied across the lossless coil 12 from time $t_0$ to time $t_1$, an increasing current I is caused to flow through the coil in the manner illustrated in FIGURE 1(c) of the drawings. Thereafter, from the time $t_1$ to $t_2$ since there is no applied voltage, this current through coil L and generator 11 which is assumed to be lossless, remains constant. However, upon the application of a negative polarity potential between the periods $t_2$ and $t_3$, the current in the coil 11 will be caused to decrease in the manner shown in FIGURE 1(c) of the drawings. The current I flowing through the coil 12 will produce a magnetic linked flux $\phi$ which is related by the expressions:

$$v = L\frac{dI}{dt} \quad (1)$$

$$I = \frac{v}{L}t \quad (2)$$

$$\phi = LI = vt \quad (3)$$

where $v$ is the value of the potential from the lossless source in volts; L is the inductance of the coil 12 in henries; I is the current in amperes, $t$ is the charging time in seconds; and $\phi$ is the linked flux in maxwells.

From a consideration of expression (3) above, it can be appreciated that in order to charge the coil 12 up to a flux value $\phi=vt$, only a small voltage $v$ is required if the charging time $t$ is long enough. This can be accomplished with a supply transformer which is small in comparison to the inductance L, and wherein the turns ratio of the primary and secondary winding is selected so that only a small primary current is required. By this means, it is possible to provide an electric flux pumping arrangement wherein the heavy currents required for flux production stay always inside a low temperature superconducting lossless environment where losses are substantially zero, and only small currents need be fed to the arrangement at normal room temperatures.

FIGURE 2(a) of the drawings illustrates an idealized circuit arrangement whereby the principles discussed above with relation to FIGURE 1 of the drawings can be used to provide a circulating current, and hence magnetic flux, of any desired magnitude. FIGURE 2(a) of the drawings shows a superconducting coil 12 which is supplied from a suitable supply transformer 13 having a superconducting secondary winding 14 which is divided into two winding halves 14a and 14b. Superconducting secondary winding 14 is inductively coupled to a primary winding 15, which preferably also is superconducting. Primary winding 15 may be connected to a conventional source of varying electrical potential operating at normal room temperatures. The superconducting secondary winding half 14a is connected in series circuit relationship with a rectifier element 16 which serves to connect the winding half 14a across the superconducting lossless coil 12 to form one lossless superconducting path for supplying current through the coil 12 in a given direction. The superconducting secondary winding half 14b similarly is connected in series circuit relationship with a rectifier element 17 that serves to connect the winding half 14b across the superconducting coil 12 to form an alternative lossless superconducting path for supplying current through the coil 12 in the same given direction. The rectified voltage $v$ appearing across the inductance 12 is shown in FIGURE 2(b) of the drawings, and the current I (as well as the flux $\phi$) produced in coil 12 by this rectified voltage is shown in FIGURE 2(c) of the drawings. From an examination of FIGURE 2(c), it can be appreciated that the coil current I induced in the lossless superconducting coil 12 by each winding half 14a and 14b during successive half cycles of the applied alternating potential, is added to the current previously caused to flow by the preceding half cycle. The result is a stairstep increase in the current I flowing through the superconducting coil 12 in the manner shown in FIGURE 2(c). The effect is similar to that obtained with a cryogenic mechanical flux pump therefor called cryogenic electric flux pumping.

It should be noted that in the arrangement shown in FIGURE 2(a) of the drawings, the superconducting secondary winding halves 14a and 14b of transformer 13 serve in the place of the lossless superconducting generator 11 of the arrangement shown in FIGURE 1. Also in place of the superconducting transformer 13, it would be possible to employ a lossless superconducting generator such as that shown in FIGURE 2(d) of the drawings. The lossless superconducting generator shown in FIGURE 2(d) is comprised by two stator winding halves 14a and 14b which are energized by a rotating permanent magnet 18, that is caused to rotate about a central axis 19. Such an arrangement would induce in the stator winding halves 14a and 14b a voltage such as shown in FIGURE 2(b), and in every sense would operate in the same manner as described with relation to the circuit shown in FIGURE 2(a). However, because the lossless superconducting generator shown in FIGURE 2(d) requires mechanically rotating parts, it is not preferred, and in the further embodiments of the flux pumping arrangement described, the transformer configuration of FIGURE 2(a) will be employed.

In the present state of development of the cryogenics field, there are no available superconducting rectifiers. That is, there are no rectifier devices which in the forward conducting direction exhibit no finite resistance. For this reason, the circuit arrangement of FIGURE 2 would not be practical. While it might be possible to employ a superconducting switching device having mechanical switching contacts in place of the rectifier elements 16 and 17 of the circuit arrangement in FIGURE 2, such a mechanical switching device would possess certain complexities and would be sufficiently unreliable as to make such an arrangement undesirable. In order to fabricate a practical electric flux pumping arrangement in accordance with the invention, it is desirable to use in place of the rectifier elements 16 and 17, a special cryotron such as that shown schematically in FIGURE 3(a) of the drawings which is switched "on" and "off" in properly controlled sequence by special sensing and control devices. The special cryotron illustrated schematically in FIGURE 3(a) is designed to accommodate large currents in the order of hundreds or thousands of amperes, and hence, will be referred to hereinafter as a power cryotron. As shown in FIGURE 3, the power cryotron is comprised by a magneto-resistive path 21 that is normally superconducting, and is acted on by the magnetic field produced by a field winding 22. In its "on" condition, that is, when no energizing current is supplied to the field winding 22, the power cryotron will exhibit the characteristics shown in FIGURE 3(b) of the drawings wherein a superconducting path (comprised by the switch arm 21a) is closed across a finite resistance 21b. This results in short-circuiting the finite resistance 21b, and provides a superconducting lossless current path. In its "off" condition, however, when an energizing current is supplied to the field winding 22, the superconducting path is in effect opened as by opening the switch arm 21a as shown in FIGURE 3(c) of the drawings. This results in presenting the finite resistance 21b to the flow of current. While cryotrons for small currents in the order of milliamperes are well known and have been well described in the literature, it is desirable that power cryotrons employed in the electric flux pumping arrangement of the present invention be so designed that they can carry very large currents in the order of hundreds of amperes, and exhibit as large as possible a resistance when in the "off" condition as illustrated by FIGURE 3(c) of the drawings. A suitable power cryotron structure for this purpose is disclosed and claimed in my copending United States application Ser. No. 284,177, filed May 29, 1963 (now abandoned), entitled, "Power Cryotron," and assigned to the assignee of the present application, and in my copending United States application Ser. No. 354,057, entitled "Power Cryotron," and filed concurrently herewith as a continuation-in-part of said application Ser. No. 284,177. Since power cryotrons may be switched on and off at a relatively rapid rate, thereby making it possible to switch them "on" and "off" at the very critical times required for flux pumping, they provide an excellent tool for use in flux pumping arrangements in spite of the fact that they exhibit a finite resistance in the open or "off" condition. The losses occasioned by reason of this last-mentioned characteristic have to be small, and will be discussed more fully hereinafter.

FIGURE 4(a) of the drawings shows a practical flux pumping arrangement constructed in accordance with the invention which employs power cryotrons to perform the switching at the critical times to be described more fully hereinafter. In FIGURE 4, the superconducting lossless coil 12 is energized from a pair of superconducting lossless secondary winding halves 14a and 14b. The winding halves 14a and 14b are coupled across the lossless coil 12 by a pair of cryotrons 23 and 24, respectively. For the purpose of the following discussion, the cryotrons will be said to be in the "on" condition when the superconducting path 23a is closed as shown by the cryotron 23, and will be said to be in the "off" condition when the current is caused to flow through the finite resistance 24b as shown by the cryotron 24. The two lossless superconducting secondary winding halves 14a and 14b are supplied from a primary winding 15 which, to keep the losses small, is also superconductive. It should be noted, however, that the primary 15 need not necessarily be superconductive. The primary winding 15 is in turn supplied from a conventional power supply operating at room temperature, and the turns ratio of the transformer comprised by windings 14, 15 is designed so that only a small primary current is required.

FIGURE 4(b) of the drawings illustrates an alternative electric flux pumping arrangement constructed in accordance with the invention. In FIGURE 4(b), the superconducting lossless coil 12 or other component to be supplied is connected across one pair of opposite terminals of a cryotron bridge comprised by four power cryotrons 31, 32, 33 and 34. The remaining pair of opposite diagonal terminals of the cryotron bridge are connected across a superconducting secondary winding 35. Secondary winding 35 is inductively coupled to, and supplied by a superconducting primary winding 15 that in turn is supplied from a conventional power supply source operating at room temperature. In the cryotron bridge arrangement of FIGURE 4(b), it can be seen that for each operating half cycle of the energizing potential supplied from the transformer 15, 35, one set of power cryotrons 33 and 34 will be in the "on" condition simultaneously, and the remaining set of cryotrons 31 and 32 will be in the "off" condition. On the alternate half cycle, the arrangement will be reversed so that a lossless superconducting path is always maintained through the superconducting coil 12, and current is supplied therethrough in the same given direction during successive half cycles. The relative merits of the circuit of FIGURES 4(b) and 4(a) will be discussed more fully hereinafter, following a more detailed description of the manner of operation of the circuit. However, because of its greater simplicity, the following description of electric flux pumping will be carried out in connection with the arrangement of FIGURE 5 of the drawings which for all intents and purposes is identical to the arrangement of FIGURE 4(a) except that leakage inductances are illustrated at 37 and 38.

As shown in FIGURE 5 of the drawings, if it is assumed that the potential $v_1$ supplied from the winding half 14a is of such a polarity that the current $I_1$ flowing through the superconducting path established by the "on" superconductor cryotron 23 is in a direction shown by the upper heavy arrow, then the current $I_L$ through the superconducting lossless coil 12 will be in the direction shown by the middle heavy arrow. If at the time $t_1$ when the polarity of the potential across the two winding halves 14a and 14b reverses in the manner shown at time $t_1$ in FIGURE 6(a) of the drawings, the power cryotron 24 is switched to its "on" condition so that a superconducting path is established between the lossless coil 12 and the superconducting lower winding half 14b, a current $I_2$ will flow through this superconducting path, and through the coil 12 in the same given direction as current $I_L$. As will be described more fully hereinafter, almost simultaneously with this action, but delayed by the time interval $\Delta t_1$, the cryotron 23 will be switched to its "off" condition. It can be seen, therefore, that there is a discrete interval of time indicated by the period $\Delta t_1$ during which both cryotrons are in their "on" condition, and the coil 12 is short-circuited. The effect of this condition will be discussed more fully hereinafter in connection with the leakage inductance of the circuit. However, for the present it should be noted that at each predetermined reversal in phase of the varying potentials $v_1$ and $v_2$, where $v_1$ is the potential across the winding half 14a, and $v_2$ is the potential across the winding half 14b, switching between the two power cryotrons 23 and 24 occurs. As a consequence of this critical switching, the input power supplied from the input transformer winding halves 14a and 14b adds to, and augments the current $I_L$ previously circulated through the superconducting lossless coil 12 as a result of the preceding half cycle of operation. The result of these successive additional current increments is illustrated in FIGURES 6(b) and 6(c) of the drawings wherein it can be seen that for each succeeding half cycle of operation, the current $I_1$ and the current $I_2$ are increased. Consequently, the total current $I_L$ flowing through the superconducting lossless coil 12, will exhibit a stair-step increase in magnitude as shown in FIGURE 6(d) of the drawings. The above phenomenon can be better appreciated from an examination of FIGURE 6(b) for example, wherein it can be seen that during the incremental period from time $t_0+\Delta t_0$ to time $t_1$, there is an increase in the current $I_1$ flowing through the circuit branch including the cryotron 23. Similarly, during the period of time from $t_1+\Delta t_1$ to $t_2$, there is an increase in the current $I_2$ flowing in a circuit branch including the cryotron 24. This increase in current occurs in the following manner. At the time $t_1$ when the voltage $v_2$ across the winding half 14b becomes positive, the cryotron 24 is closed. Hence, during the interval of time $\Delta t_1$ until $I_1$ becomes zero and the cryotron 23 is switched to its "off" position by the control circuitry, the superconducing coil 12 is short-circuited. During this brief interval, $\Delta t_1$ the difference voltage Δv has an opposite direction compared with the foregoing voltage $v_1$, and feeds the circuit comprised by the two leakage inductances 37 and 38 to produce the superimposed current indicated by the dashed arrows in each winding half 14a and 14b. Since this superimposed current in the winding half 14a opposes the current $I_1$, the current $I_1$ decreases towards zero. Simultaneously, the superimposed current builds up the current $I_2$. The arrangement is so designed that as the current $I_1$ reaches zero, the cryotron 23 is immediately caused to open by the control circuitry to avoid having to switch any of the energy of the leakage inductance, and thereby avoids additional losses which otherwise would occur. From a further examination of FIGURES 6(b) and 6(c), it can be appreciated that with increasing time, the currents $I_1$ and $I_2$ increase, and that therefore the time Δt required in order to commutate the currents $I_1$ and $I_2$ also increases. Hence, it follows that $Δt_3$ is greater than $Δt_2$ which is greated than $Δt_1$, and so on. From this, it can be appreciated that the time for switching "off" the cryotrons cannot be fixed, but has to be controlled by the control circuitry which senses when currents $I_1$ and $I_2$ go through zero, and then operates to switch the power cryotrons 23 and 24 to their "off" condition. The manner in which this is accomplished will be described more fully hereinafter in connection with FIGURE 12 of the drawings. Additionally, in the foregoing and following description, it should be noted that although a small negative current flows through the finite resistance R of the "off" cryotron as shown in FIGURES 6(b) and 6(c), this current will be neglected since it is small, and has no appreciable effect on the operation of the flux pumping arrangement except for its losses which will be discussed subsequently.

If by means of the above referred-to control circuit, the switching of the power cryotrons 23 and 24 is adjusted by a suitable phase shift and current-sensing control to switch the power cryotrons on at the proper phase of the operating potentials $v_1$ and $v_2$, and off at the current zero, a different effect from that shown in FIGURE 6 can be obtained. For example, FIGURE 7(a) of the drawings shows the effect achieved where the switching "on" and "off" of the power cryotrons 23 and 24 occurs at a point in the cycle centered about the phase values of 90° and 270°. When operating in this manner, the cryotron 23 will be switched on at times $t_1$, $t_3$, etc. and the power cryotron 24 will be switched on at times $t_2$ to $t_4$, etc. It therefore follows that the cryotron 23 will be on from time $t_1$ to time $t_2+Δt$, etc. From a consideration of FIGURE 7(a) of the drawings, it can be seen that the effective voltage area between the times $t_1+Δt$ and the time $t_2$ which is hatched, is half positive and half negative, and that the average voltage area is zero. As a consequence, the average coil current $I_L$ will not change as shown in FIGURE 7(d) of the drawings. With a smaller phase angle than that shown in FIGURE 7(a) [but which is not so small as the phase angle shown in FIGURE 6(a)], the average coil voltage will be positive, but will be smaller than shown in FIGURE 6(a); and will result in smaller incremental increases in the average coil current $I_L$.

Figure 8:
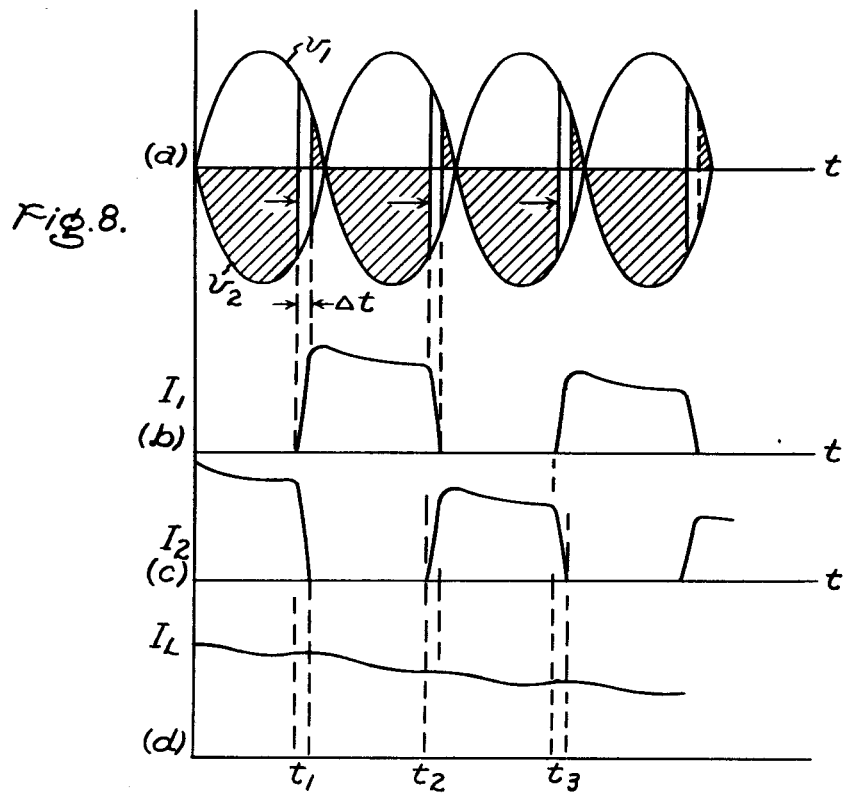
FIGURE 8 is a series of voltage vs. time and current vs. time characteristic curves for the circuit of FIGURE 4(a), and illustrates the mode of operation of the circuit for decreasing current supplied to the lossless coil being energized.

If th phase angle at which the cryotrons 23 and 24 of FIGURE 5 are switched, is increased from that shown in FIGURES 6 and 7, an average negative voltage across the winding halves will result by means of which the current through the superconducting coil 12 can be reduced in the manner shown in FIGURE 8 of the drawings. As shown in FIGURE 8(a), the cryotron 23 is switched on at times $t_1$, $t_3$, etc., and the cryotron 24 is switched on at times $t_2$, $t_4$, etc. As a consequence of operation in this manner, the effective voltage area of the voltage $v_1$ will be from time $t_1+Δt$ to time $t_2$, and and as seen in FIGURE 8(a), this effective voltage area which is hatched, is negative. The same is true of the voltage $v_2$. As a consequence, the currents produced by these voltages will decrease with time as shown in FIGURES 8(b) and 8(c) of the drawings. The resulting effect on the current $I_L$ through the superconducting coil 12 is shown in FIGURE 8(d) where it can be seen that the value of the current $I_L$ gradually decreases in a stair-step manner with time. From the foregoing description, it can therefore be appreciated that the flux pumping arrangement can be so controlled by a simple adjustment of the switching "on" times relative to the phase of the varying electric supply potential that the current pumped into the superconducting lossless coil can be either increased, maintained constant, or decreased as desired. Furthermore, if the coil 12 is charged with the current $I_L$ and then the primary voltage of the transformer is reduced to zero, the coil current $I_L$ will continue to flow as a permanent current, and the control windings of the cryotrons can be switched off so that both cryotrons are in the "on" position.

In order to attain good flux pumping performance from the arrangement shown in FIGURE 5 of the drawings, it is necessary that the power cryotrons 23 and 24 be switched "off" accurately at the precise time that the current flowing through the cryotron passes through zero. This highly accurate switching is necessitated by the fact that the current buildup is so rapid that if switching is not accurately timed, large currents may have to be switched by the cryotron. It is possible to limit the current having to be switched by the cryotron, and thereby obviate the need for precise accuracy in switching. This is accomplished by the use of a saturated reactor or choke in the cryotron circuit. FIGURE 9(a) of the drawings is a schematic circuit diagram of a circuit comprised by a superconducting saturable reactor 41 connected in series circuit relationship with a resistor 42 across an alternating current source of energizing potential. If the saturable choke or reactor 41 has a characteristic hysteresis curve such as that shown in FIGURE 9(b) of the drawings, then the effect on the sinuoidal current flowing through the resistor 42 will be that shown in FIGURE 9(c) of the drawings. FIGURE 9(c) is a current versus time characteristic curve for the circuit of FIGURE 9(a) wherein it can be seen that for a short time Δt after each current reversal, the current through the resistor 42 will be maintained at a very small value ΔI represented by the width of the hysteresis loop shown in FIGURE 9(b). Accordingly, any switching that occurs during the interval of time Δt need only switch the very small current value ΔI.

The above principle is applied in a flux pumping arrangement shown in FIGURE 10 of the drawings, wherein it is seen that a pair of saturable reactors 43 and 44 are connected in the basic flux pumping arrangement of FIGURE 4(a). In the arrangement of FIGURE 10, the saturable reactor 43 is connected in series circuit with the power cryotron 23, and the saturable reactor 44 is connected in series circuit with the power cryotron 24. In operation, the arrangement of FIGURE 10 functions in the following manner. If it is assumed in FIGURE 11 that at time $t_1$ the power cryotron 23 is to be turned on, and the cryotron 24 is already on, then at time $t_1$, the current buildup $I_1$ will commence as described previously with relation to FIGURE 6 of the drawings. The commutation will not start immediately, however, since the saturable reactor 43 must be first driven from point 1 on its hysteresis curve shown in FIGURE 10(b) to point 2 where it is in positive saturation. This results in causing a change in flux $Δφ_D$, with only the small magnetizing current ΔI being required. This change in flux which is twice shown by the cross-hatched area in FIGURE 11(a) is given by the expression $Δφ_D = ∫2v_1 dt$. Thereafter, upon the saturable reactor 43 being saturated, if does not consume any further voltage, and commutation of the currents $I_1$ and $I_2$ will commence in the previously described manner. For easier understanding, it was assumed that the leakage inductances of the transformer were negligible so that the current $I_1$ increased rapidly, and current $I_2$ decreased rapidly in the manner shown to provide substantially a square wave. Under these ideal conditions, the switching off of the cryotron 24 would occur at time $t_2$. However, such ideal conditions are not obtainable in practice and the switching may be delayed so that it occurs instead at time $t_3$. The requirement for this additional switching off time can be appreciated from FIGURE 10(c) of the drawings wherein it can be seen that in order for the saturable reactor 44 to be driven from the positive saturation point 2' on its hysteresis curve to the point 3', a small current $\Delta I$ is required for the period of time $t_2$ to $t_3$, and at the termination of this interval, only the small current $\Delta I$ need be switched. From the time $t_3$ on, the flux in either saturable reactor does not change until time $t_4$ when the alternate switching cycle is initiated. In FIGURE 11(a), the two cross-hatched areas between the times $t_1$ and $t_2$, and times $t_2$ and $t_3$ will be equal since both will be a half of the change in flux $\Delta\phi_D$. If the switching "off" occurs immediately after $t_2$, a smaller flux change $\Delta\phi_D$ is needed, then the cross-hatched areas of FIGURE 12(a) will become smaller.

Having described several constructions for suitable electric flux pumping arrangements in accordance with the invention, one such arrangement complete with the sensing and control circuitry required to achieve switching on and off of the cryotrons at the critical times, is illustrated in FIGURE 12. The flux pumping arrangement shown in FIGURE 12 is basically that of FIGURE 4(a) with the addition of the control circuitry. For this reason, the same reference numerals are employed to indicate like parts in each circuit. The flux pumping arrangement in FIGURE 12 includes a superconducting lossless coil 12 or other component to be energized from the two secondary winding halves 14a and 14b of a supply transformer whose superconducting primary winding 15 is connected to a suitable source of varying electric potential. The secondary winding half 14a is connected in a closed circuit with the lossless coil 12, a superconducting saturable reactor winding 43, and a power cryotron 23. The superconducting condition of the cryotron 23 is turned "on" and "off" by a field winding 23c so that the presence of a current in the field winding 23c causes the crytron 23 to be rendered non-superconducting, and therefore in its "off" condition, while the absence of a current in the field winding 23c allows the cryotron 23 to be superconducting, and hence in its "on" condition. In its "on" condition, the cryotron 23 serves to couple the secondary winding half 14a across the superconducting lossless coil 12 to be energized. Similarly, coil 12 is energized during alternate half cycles of the alternating supply potential by an alternate superconducting lossless path comprised by the secondary winding half 14b, a saturable reactor 44, and a power cryotron 24 upon the cryotron 24 being turned "on." The condition of the cryotrons 23 and 24 is controlled by control units 51 and 52, respectively, and since the control units 51 and 52 are identical in construction and operation, only the control unit 51 will be described in detail.

The control unit 51 is comprised by an adder 53 that in one specific embidiment comprised a polarized relay having a movable contact 81 acted on by two control windings 82 and 83. The control winding 82 is connected to the rectified output from a variable phase shift network 54, and upon being energized, operates on movable contact 81 to cause it to open in the manner shown. The phase shift network 54 is of conventional construction, and is supplied from the same power supply used to energize the input superconducting transformer 14, 15. The remaining control winding 83 of adder 53 is connected to the output from a Wheatstone bridge, and when energized with a positive current $i_b$, it operates to cause the movable contact 81 to open in the manner shown.

The Wheatstone bridge is comprised by a pair of resistor arms 55 and 56 which are conventional resistors, and two resistor arms 57 and 58 which are magneto-resistive elements. By magneto-resistive is meant a resistor whose value of resistance varies upon the application of the electromagnetic field thereto, with the value of the resistance being determined by the magnitude of the electromagnetic field. The two magneto-resistive resistors 57 and 58 are disposed in the field of a pair of superconducting coils 59 and 60, with the coil 59 acting on the magneto-resistive element 57, and the coil 60 acting on resistor 58. The coils 59 and 60 are energized from a source of electric current indicated at 62 through an on and off switch 63 that serves to connect the battery 62 across one pair of opposed terminals of Wheatstone bridge comprised by the four resistor elements 55 through 58. In addition to the magnetic field produced by the coil 59, the magneto-resistive resistor 57 is acted upon by the magnetic field of a superconducting winding 65 which is connected in circuit relationship with the power cryotron 23 and lossless coil 12. Similarly, the magneto-resistive element 58 is acted on by a superconducting winding 66 likewise connected in series circuit relationship with the power cryotron 23 and lossless superconducting coil 12 along with the winding 65. It should be noted, however, that the effect of the two windings 65 and 66 on their respective magneto-resistive elements 57 and 58 will not be the same since the two windings 65 and 66 are arranged in opposition to each other. Accordingly, if it is assumed that the battery 62 provides a bias current $I_B$ flowing through the coils 60 and 59 in the direction indicated by the arrows, it can be appreciated that the current $I_1$ flowing in the superconducting winding 66 will produce a magnetic field which will aid the magnetic field of the coil 60, but the field produced by winding 65 will subtract from the magnetic field of the coil 59. By proper adjustment of the value of the bias current $I_B$, and of the value of the resistors 55, 56, the bridge arrangement can be adjusted to provide a positive bridge output $i_b$ for current flow $I_1$ in a given direction through the windings 65 and 66. However, upon reversal of current flow $I_1$ through the windings 65 and 66, this bridge output current $i_b$ will become negative. The bridge output signal $i_b$ is obtained from the remaining pair of opposite terminals of the bridge, and is supplied to the control winding 83 of the polarized relay comprising adder 53.

Figure 13:
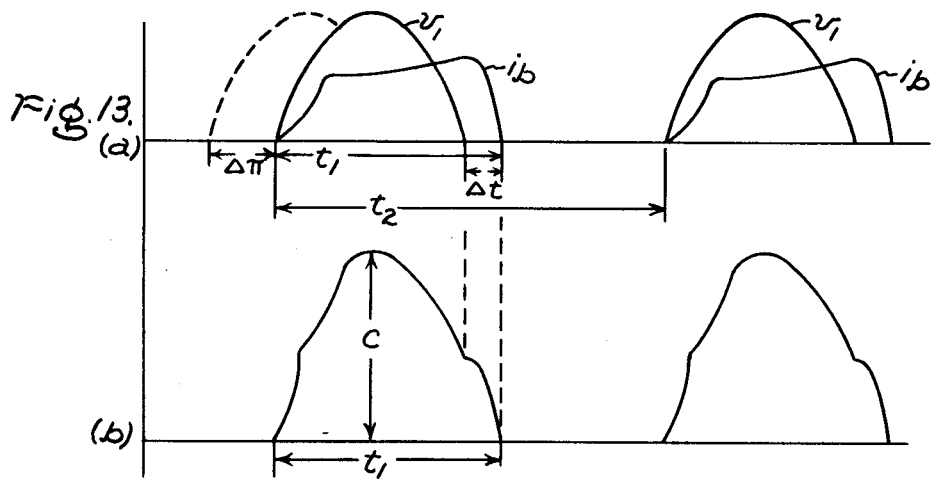
FIGURE 13 is a series of time vs. voltage, and time vs. current graphs illustrating the operating characteristics of the sensing and control circuit portions of the overall electric flux pumping scheme of FIGURE 12.

In the adder 53, the bridge output signal $i_b$ is added to the rectified phase shifted voltage (hereinafter referred to as $v_1$) supplied from the variable phase shifting network 54. If the sum of both of these signals is positive, the movable contact 81 of the polarized relay will be caused to open so that no energizing current is supplied to the field winding 23c of power cryotron 23. This causes the power cryotron 23 to be maintained in its "on" position allowing a superconducting current to flow therethrough. This effect is illustrated in FIGURE 13 of the drawings whereon in FIGURE 13(a) the rectified phase shifted voltage which has been phase shifted an amount $\Delta\pi$ is shown at $v_1$, and the bridge output signal is shown at $i_b$. The sum of these two signals is shown as control signal $c$ in FIGURE 13(b) wherein it can be seen that a positive control signal will be maintained on the relay windings for the time interval $t_1$. At the end of the time interval $t_1$, it can be seen that the bridge output signal $i_b$ goes to zero and tends to become negative due to a reversal of the current $I_1$ flowing in the flux pumping arrangement as described in the preceding paragraph. Upon this occurrence, the polarized movable contact arm 81 will immediately close on its fixed contact so that a control current is supplied to the field winding 23c of the power cryotron 23 thereby causing the power cryotron to be switched to its "off" condition. Thereafter, upon the next succeeding positive half cycle at time $t_2$ when the control signal $c$ in FIGURE 13(b) again goes positive, the polarized relay contact 81 will again be interrupted. As a consequence, the control current to the field winding 23c will be interrupted, and results in switching the power cryotron 23 to its "on" condition. In order to change the charging of the superconducting lossless coil 12, the time for switching "on" of the power cryotron 23 must be shifted. This is accomplished by varying the phase shift $\Delta\pi$ of the rectified voltage $v_1$ with the variable phase shifting network 54. The switching "off" of the power cryotron is determined by the bridge network sensing when the current $I_1$ goes through zero. Instead of determining in the adder 53 whether the sum of the bridge output signal $i_b$ and the phase shifted rectified voltage $v_1$ is zero, a rectifier could be placed in the output of the Wheatstone bridge, and the two rectifier voltages added directly to produce an output current that could be used to control the field winding 23c directly.

As an alternative to the above arrangements, a purely electronic device could be employed which adds, amplifies and determines whether or not a control current should be supplied to the control winding 23c of the power cryotron. Further, in order to take care of delayed switching, a derivation of the current $I_1$ could be used in deriving the control current to be supplied to the control winding 23c. Further, instead of developing the output signal from the Wheatstone bridge by magneto-resistive effects as shown in FIGURE 12, a cryotron bridge could be used or even a Hall element. Still another and preferred alternative to these various arrangements is the reactor cryotron of this invention illustrated in FIGURE 15 and described in detail below.

Instead of two separate variable phase shift networks 54 and 54', it might be desirable that the two phase shift networks be ganged to a common control, or there may be a single common phase shift network substituted in their place. Other similar alternative arrangements will be suggested to those skilled in the art. In all events, the control units 51 and 52 operate to switch the power cryotrons 23 and 24 "on" upon the rectified phase shifted voltage $v_1$ or $v_2$, respectively, going positive, and sense a reversal of the currents $I_1$ or $I_2$, respectively, to switch the power cryotrons "off."

To complete the flux pumping arrangement of FIGURE 12, a master on/off switch 68 is provided for starting and stopping the equipment, and a variable resistor 70 is connected in the power supply lead, to control the magnitude of the supply potential. That portion of the flux pumping arrangement which operates at cryogenic temperatures is shown enclosed by the dash-dot line 61 which represents a suitable cryogenic housing. Because such structures and the techniques for maintaining a cryogenic environment are well known in the art, a further description thereof is not deemed necessary.

In placing the flux pumping arrangement of FIGURE 12 in operation, the control units 51 and 52 are first activated by closing the control switches 63 of each unit. Thereafter, the master on/off control swith 68 is closed, and variable resistor 70 is adjusted to apply a desired magnitude varying electric potential to the input superconducting transformer 14, 15. In turning off the equipment, the reverse procedure is followed. After turning on the equipment, the phase shifted, rectified voltage $v_1$ is added to the value of the bridge output current $i_b$ in the adding devices 53 of each control unit 51 and 52. The control units 51 and 52 then operate in the above-described manner to develop a control current $c$ which switches the power cryotrons 23 and 24, respectively, "on" and "off." For example, with respect to power cryotron 23, if the control current $c$ shown in FIGURE 13($b$) becomes positive, the power cryotron 23 will be switched to its "on" condition, and if the current $c$ approaches zero or tries to become negative, the power cryotron 23 will be switched to its "off" condition. As stated earlier, the magneto-resistive elements 57 and 58 of the bridge are exposed to the two superconductive windings 65 and 66, respectively, through which the current $I_1$ flows, as well as to the magnetic field produced by the flow of the bias current $I_B$ through the windings 59 and 60. If the current $I_1$ is positive which is defined to be in the direction of the arrows shown in FIGURE 12, the bridge circuit will develop an output current which is positive, resulting in a positive control current $c$ that switches power cryotron 23 to its "on" condition. If the current $I_1$ is in a reverse or negative direction, the bridge circuit delivers a corresponding negative output signal to the adder network 53 which then develops a negative control signal $c$ that switches the power cryotron to its "off" condition. The control unit 52 operates in a similar fashion with respect to the current $I_2$, and power cryotron 24, but is 180° out of phase with respect to control unit 51.

From the above description, it can be appreciated, therefore, that the flux pumping arrangement in FIGURE 12 operates to produce current flow of a controllable magnitude through the superconductive lossless coil 12 or other component by means of a superconducting lossless source of varying electric potential comprised by the secondary windings 14a and 14b of the input transformer. This can be achieved by operatively coupling the lossless source of varying electric potential through alternate lossless superconducting paths 23 or 24 across the superconducting lossless coil 12. Hence, the lossless source of varying electric potential 14a is alternately connected across the lossless superconducting coil 12 through one of the lossless superconducting paths 23 upon the varying electric potential measured with respect to the one superconducting path 23 attaining a predetermined phase relationship whereby current is induced to flow through the one superconducting path and through the lossless superconducting coil 12 in a given direction. Alternately, the lossless source of varying electric potential 14b is connected across the lossless superconducting component 12 through an alternate lossless superconducting path 24, upon the varying electric potential from the lossless source measured with respect to the alternate superconducting path 24 attaining a predetermined phase relation relative to the potential measured with respect to the one superconducting path 23 whereby current is induced to flow through the alternate superconducting path, and through the lossless superconducting coil 12, in the same given direction. Alternately, the one superconducting path 23 is effectively disconnected from the lossless superconducting component 12 upon the connection of the alternate superconducting path 24 to the component 12, such disconnection being substantially simultaneous with the reversal of current $I_1$ flow through such one superconducting path 23. Alternately, the alternate superconducting path 24 is disconnected from the lossless superconducting component upon the alternate connection of the one superconducting path 23 to the lossless superconducting component upon the varying electric potential measured with respect to the one superconducting path 23 attaining a predetermined phase relation relative to the potential measured with respect to the alternate superconducting path 24, such effective disconnection being substantially simultaneous with the reversal of current $I_2$ flow through such alternate superconducting path 24. By proper adjustment of the variable phase shift networks 54 and 54', the alternate connection and disconnection of the alternate superconducting path occurs upon the varying electric potential attaining a predetermined positive phase relation within the ranges 0° to 90° and 180° to 270° whereby a current of increasing magnitude is induced to flow through the one superconducting path and through the lossless superconducting component. Again, by proper adjustment of the phase shift networks 54 and 54', the alternate connection and disconnection of the two superconducting paths occurs upon the varying electric potential attaining a predetermined positive phase relation centered about the values 90° and 270° as centers, whereby current of a constant magnitude is induced to flow through the lossless superconducting coil in a given direction. Thirdly, again by proper adjustment of the variable phase shift networks 54 and 54', it is possible to achieve alternate connection and disconnection of the alternate superconducting paths upon the variable electric potential attaining a predetermined positive phase relation within the range 90° to 180° and 270° to 360° whereby current of a decreasing magnitude is induced to flow through the lossless superconducting coil 12. It therefore can be appreciated that the novel flux pumping arrangement made available by the present invention allows the circulating current through a superconducting coil, and hence the flux produced by this coil, to be readily increased, or decreased or maintained at a desired constant value within the design limitations of the system. Further, if the novel flux pumping arrangement is stopped, a circulating current of constant magnitude is permanently frozen into the superconducting coil or other lossless component being energized. In addition to these advantages, it should be noted that all of the large circulating currents through the lossless superconducting coil 12 are retained within the low temperature superconducting environment within the housing 16 so that the heavy currents for the flux production stay always inside the low temperature superconducting environment where losses are substantially zero. Then, only small currents need be supplied to the arrangement at normal room temperatures through the input terminals connected through the on/off master control switch 68.

In FIGURE 15, a reactor cryotron generally indicated at 80 is associated with a control circuit generally indicated at 81, and with transformer 82 maintained at 4.2° K. and having its secondary winding 83 connected through a saturable reactor 85 and a power cryotron 86 (schematically shown) to a resistive load 88. The reactor flux $\phi$ has the hysteresis loop of FIGURE 9(b). Suitably, transformer 82 delivers a rectangular voltage V, as indicated by curve V of FIGURE 16(a).

Saturable reactor 85 has a secondary or signal winding 90. In the operation of the apparatus of FIGURE 15, at time $t_1$ a large current I flows [FIGURE 16(c)] and reactor 85 is saturated [point P of FIGURE 15(a)]. At $t_2$, the voltage V reverses and the current tends to follow as indicated by curve I of FIGURE 16(a). However, when the small negative magnetizing current $i$ [FIGURES 15(a) and 16(a)] is reached, reactor 85 leaves its positive saturation state and flux $\phi$ moves along K–L on the hysteresis loop. Voltage V lies now at reactor 85 and in its secondary or signal winding 90 negative voltage U' [FIGURE 16(b)] is induced which, via rectifier 91, energizes relay 92. Contact 93 then closes and control current $I_C$ [FIGURE 16(c)] flows from battery 94 through closed contact 95 of relay 97 and closed contact of relay 92 to control coil 98 of cryotron 86. During this time [represented by $\Delta t$ in FIGURE 16(a)] in which reactor 85 goes from positive to negative saturation, only a small magnetizing current $i$ flows and control current $I_C$ is built up. At $t_3$, negative saturation is reached and the current is now $$I_0 = \frac{V}{r_0}$$

and is determined by the resistance $r_0$ of the now resistive cryotron 86. Resistance $r_0$ is assumed to be large compared to the resistance of load 88. After $t_3$, reactor 85 consumes no voltage and U' becomes zero. Relay 92 remains energized through closed contact 93. At $t_4$, voltage V becomes positive again and the current again tries to follow. However, reactor 85 now limits the current to the small positive magnetizing current $+i$ and the flux $\phi$ moves along M–N on the hysteresis loop of FIGURE 15(a). In secondary winding 90 of reactor 85, an opposite voltage $u$ is induced which, due to rectifier 100, energizes only relay 97, opens its contact 95 and interrupts the current to relay 92 and thus control current $I_C$ to control winding 98. In the absence of any control field, cryotron 86 thus becomes superconductive. After this time interval $\Delta t$, at $t_5$ of FIGURE 16(a), positive saturation is reached and the full current $$I = \frac{V}{R}$$

flows.

The time interval $\Delta t$ provided by reactor 85 during which the current is kept small, is very important since it gives cryotron 86 time to change from the resistive to the superconductive state. Without the current limitation during $\Delta t$, the decreasing cryotron resistance would cause an increasing current I and such losses that the cryotron might reach its transition temperature and not become superconductive.

In the FIGURE 15 apparatus, the reactor cryotron is switched "on" and "off" by signals derived from reactor 85. For many applications, only the "on" signal from the reactor would be used to produce a reverse resistance when negative currents would flow. The "off" signal, which makes cryotron 86 superconductive, can be derived from any signal source, e.g. by the signals of a phase shifter. Then the controlled reactor cryotron resembles a controlled rectifier which by a firing signal can be made conductive and offers a very large resistance for negative currents. All circuits for controlled rectifiers can be used for controlled reactor cryotrons. For example, it is possible to build a full-wave rectifier circuit for large D.C. currents. The rectifier can be connected to a superconductive coil. Such a circuit can be made entirely of superconductive material. Since a reactor cryotron has no resistance in the forward direction, the circuit represents a D.C. supply with no internal resistance which has approximately a constant D.C. voltage. Therefore, the current supplied to a superconductive coil will increase linearly with time. If the primary current into the transformer is interrupted, the D.C. current will continue to flow as a persistent current because at least one of the two cryotrons acts as superconducting short circuits across the coil. If the reactor cryotron is controlled by a phase shifter, as mentioned above, the magnetic field increase can be adjusted and even a flux decrease can be achieved; then, energy is fed back into the power supply. Such a circuit controls the flux in an inductive load with no moving mechanical parts and could thus be called an electrical flux pump.

In addition to the single phase flux pumping arrangements heretofore described, it is possible to construct multi-phase flux pumping arrangements in accordance with the invention. FIGURE 14 of the drawings illustrates a suitable three-phase flux pumping arrangement wherein a lossless superconducting coil 12 is supplied from three Y-connected superconducting lossless secondary windings 71, 72 and 73 of a superconducting transformer. The superconducting winding 71 is connected across the superconducting coil 12 by a suitable superconducting power cryotron switch 74, the winding 72 is connected across the superconducting coil 12 by a power cryotron 75, and the superconducting winding 73 is connected across superconducting coil 12 by a power cryotron 76. The Y-connected superconducting secondary windings 71–73 are energized from a delta-connected primary winding comprised by the superconducting coils 77, 78 and 79, respectively, which in turn are energized from a suitable three-phase source of supply maintained at normal room temperature. In operation, the switching power cryotrons 74, 75 and 76 will be actuated from individual control units such as that shown at 51 in FIGURE 12 to alternately connect proper ones of the secondary windings 71, 72 or 73, respectively, across the superconducting lossless coil 12 in proper phase relationship as discussed previously in connection with the single phase versions of the arrangement.

The flux pumping arrangement of FIGURE 17 is generally similar to that of FIGURE 14, differing principally in that the controlled reactor cryotron of this invention is employed to operate each of the pump circuits. In other words, instead of control unit 51 of FIGURE 12, a saturable reactor 85 is used in combination with a control circuit 81 in each of the three parallel super conducting secondary winding circuits. Thus, this apparatus is a three-phase flux pumping arrangement wherein lossless superconducting coil 101 is supplied from three Y-connected superconducting lossless secondary windings 102, 103 and 104 of a superconducting transformer. Superconducting winding 102 is connected across coil 101 by saturable reactor 107 and power cryotron 108. Similarly, windings 103 and 104 are connected across coil 101 by saturable reactor 110 and power cryotron 111 and by saturable reactor 112 and power cryotron 113, respectively. The Y-connected superconducting secondary windings 102, 103 and 104 are energized from a delta-connected primary winding of superconducting coils 115, 116 and 117, respectively, which are energized in turn from a suitable three-phase source of supply maintained at room temperature. The components of FIGURE 17 maintained in operation at liquid helium temperature (4.2° K.) are enclosed in the dotted-line rectangle. Three separate and independent control units the same in construction, mode of operation and results as control unit or circuit 81 are diagrammatically indicated at 120 and are functionally associated with the respective saturable reactors 107, 110 and 112 to control cryotrons 108, 111 and 113. Again, as in the embodiment of this invention shown in FIGURES 12 and 14, a single common phase shift network 123 is coupled to the three control circuits 120 for the purposes described above in reference to the FIGURE 12 flux pumping arrangement. Thus, through the power cryotrons and their associated saturable reactors and control circuits, secondary windings 102, 103 and 104 will alternately and in predetermined desired sequence be connected across superconducting lossless coil 101.

Figure 18:
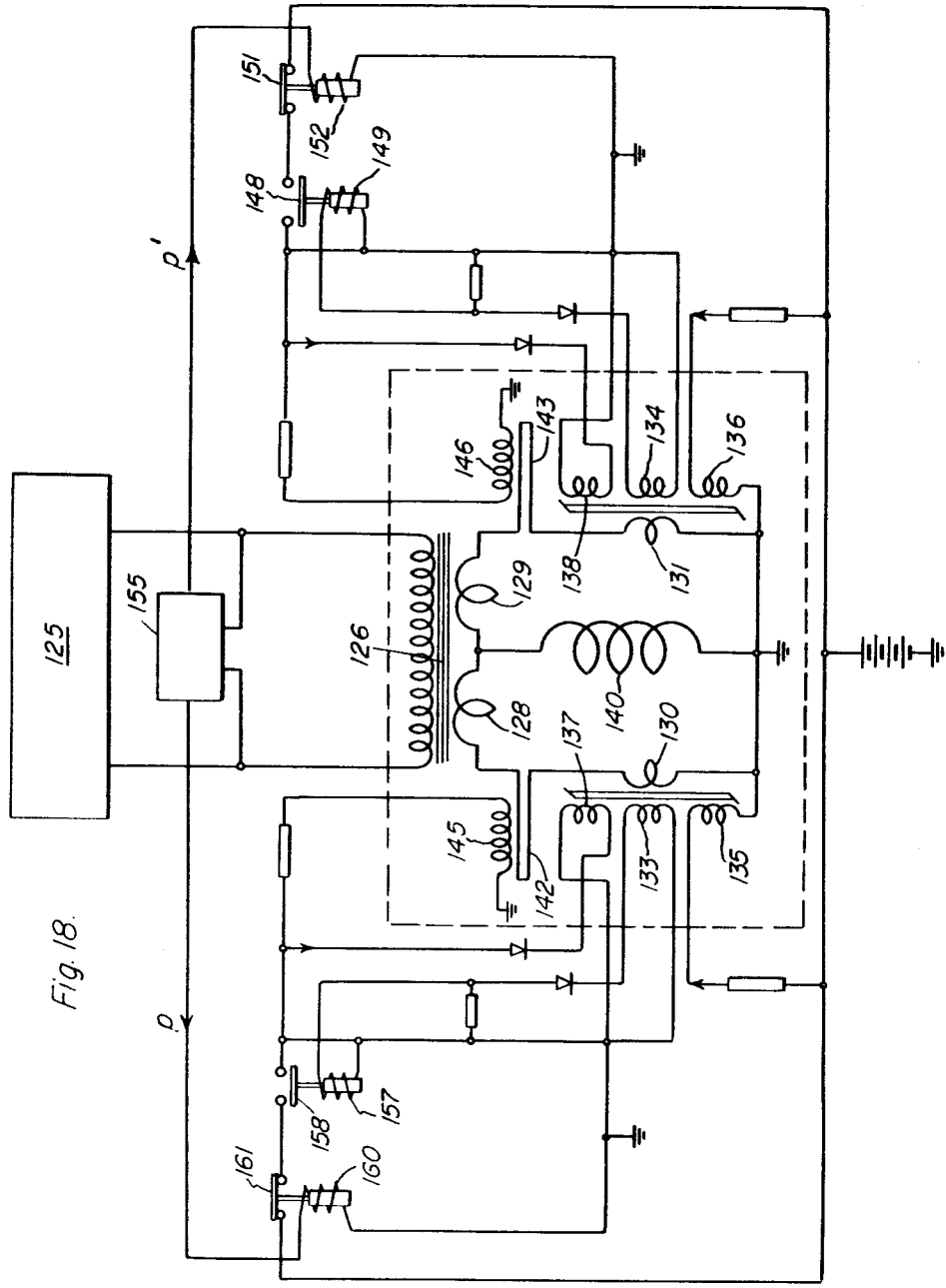
FIGURE 18 is a schematic circuit diagram similar to FIGURE 12 but showing an alternative electric flux pumping apparatus of this invention incorporating the new reactor-cryotron in a preferred form.

With reference to FIGURE 18, the flux pumping apparatus therein illustrated is generally similar in structure, mode of operation and results to the other embodiments of this invention described in detail above. Thus, this apparatus includes a reactor cryotron of this invention in each of two parallel secondary winding circuits across a superconductive lossless coil which is pumped from an alternating current source through the switching controls of the two reactor cryotron circuits. More specifically, from a source of 10 cycles per second, alternating current source power is delivered to transformer 126 resulting in rectangular voltages (as described above) at secondary windings 128 and 129 of the transformer. Saturable reactors 130 and 131, which are connected to windings 128 and 129, respectively, have in addition to signal windings 133 and 134, bias windings 135 and 136 and retarding windings 137 and 138.

In operation, a small current flows through bias windings 135 and 136 prior to start-up of the flux pump and this insures that reactors 130 and 131 will both have a small positive saturation. Subsequently, however, retarding windings 137 and 138 will operate to keep their respective reactors in negative saturation and consuming no voltage as long as the cryotrons controlled by the reactors are in their resistive state.

In the FIGURE 18 apparatus, as in that of FIGURE 12, superconducting lossless coil 140 is connected to windings 128 and 129 through saturable reactors 130 and 131 and cryotrons 142 and 143. Control coils 145 and 146 of cryotrons 142 and 143, respectively, open and close the secondary winding circuits in synchronism with the changes in current direction as explained fully in reference to the other embodiments of this invention illustrated herein. Thus, when cryotron 142 is superconductive and cryotron 143 is resistive because its control coil 146 is excited by current through contact 148 of the energized relay 149 which obtains its coil current over its closed contact 148 and closed contact 151 of relay 152 which is not energized, the current coming from contact 148 goes through retarding coil 138 and the core of reactor 131, therefore, is maintained in negative saturation. Shortly thereafter, phase shifter 155 produces a pulse $p'$ which for a short time energizes relay 152, opening contact 151 and interrupting the current to relay 149 which opens its contact 148, de-energizing cryotron control coil 146 so that cryotron 143 becomes superconducting. The current from secondary coil 129 is limited by reactor 131 and its flux moves along the hysteresis loop, as above described.

After time $\Delta t$ which is required to bring the core of reactor 131 from negative to positive saturation, reactor 130 leaves positive saturation and limits the current coming from secondary winding 128. Then signal winding 133 produces during $\Delta t$ a voltage which energizes a relay 157 and closes its contact 158 and a current flows into control winding 145 of cryotron 142 and into retarding winding 137. With the core of reactor 130 at negative saturation, voltage to this reactor from transformer 126 again becomes positive but since the retarding current still flows in winding 137, reactor 130 stays in negative saturation and consumes no voltage. Phase shifter 155 gives signal pulse $p$ and energizes relay 160 which switches off relay 157 and opens contact 161. The current through control winding 145 and the retarding current through winding 137 are interrupted and reactor 130 leaves the negative saturation state and follows the hysteresis loop as previously described herein.

Having described several forms of electric flux pumping arrangements and the manner of their operation, it is believed appropriate at this point to discuss further the characteristics of these flux pumping arrangements. Assuming that the cryotrons 23 and 24 of the flux pumping arrangement of FIGURES 4(a), 5 and 12 operate to supply a rectified voltage across the superconducting lossless coil 12 having a wave form such as shown in FIGURE 2(b), then the increase in flux $\Delta \phi$ and current $\Delta I_L$ per half cycle $T/2$ is given by the expression:

$$\Delta \phi = L \Delta I = \int_0^{\frac{T}{L}} v \, dt = V \sqrt{2} \frac{2}{\pi} \cdot \frac{T}{2} = 0.9 V \frac{T}{2} \quad (4)$$

where V is the RMS voltage. In each half cycle, the same amount of increased flux $\Delta \phi$ is pumped into the superconducting lossless coil 12, and hence the flux and current will increase in the stair-step manner shown in FIGURE 2(c) of the drawings. For this reason, the supply transformer comprised by the secondary windings 14a and 14b and the primary winding 15 can be kept small compared with the superconducting lossless coil 12; however, because of the larger circulating currents in the secondary winding halves, the secondary winding must be fabricated with larger cross-section wires or ribbons than the primary winding. By selecting the proper turns ratio for the transformer, however, the current in the primary winding 15 can be kept quite small with respect to the secondary current.

As discussed previously, a power cryotron in its "off" condition still presents a finite resistance R in series with the lossless superconducting coil 12. It has been determined that in spite of this finite resistance, which should be as large as possible, electric flux pumping with its increasing, reversing and permanent currents is possible, assuming that the cryotron is switched "on" and "off" at the very critical switching times discussed above. While it is in the "off" condition, the voltage across the finite resistance R of the cryotron is two times the supply voltage (2v), and since each cryotron will be "off" for a half cycle and "on" for a half cycle, the power loss per cryotron is given by the expression:

$$p = \frac{1}{2} \frac{(2V)^2}{R} = \frac{2V^2}{R} \quad (5)$$

In connection with the above Equation 5, it should be noted that with the flux pumping arrangement of FIGURE 4($b$), the full voltage $2v$ across the secondary winding is coupled across the superconducting lossless coil 12. It should also be noted that this full voltage $2v$ is also across each of the cryotrons 31 and 32, with the losses in each cryotron being given by Equation 5 above. However, since the voltage feeding the superconducting lossless coil 12 is twice as big as in the arrangement in FIGURE 4($a$), it follows that the loss per unit of delivered power is the same. Additionally, it should be noted that the secondary winding of the supply transformer in the arrangement of FIGURE 4($b$) is better utilized, and even though the arrangement does require two additional switching cryotrons, it may be preferred for certain applications.

As stated above, the losses caused by the resistances of the switching cryotrons must be kept small since they cause evaporation of the liquid refrigerant required to maintain the low temperature superconducting environment. It is known that 2620 joules of energy or .731 watt hours of energy will evaporate approximately one liter of liquid helium. Accordingly, it can be appreciated that to improve over-all system efficiency, it is necessary that the losses caused by these resistances be kept as small as possible. To determine these losses, assume that the value of $p$ and R are given then from Equation 5, the effective voltage V is given by the expression:

$$V = \sqrt{\frac{pR}{2}} \qquad (6)$$

If the maximum coil current is $I_L$ then the maximum power $P_T$ which the supply transformer is to deliver is given by the expression:

$$P_T = V\sqrt{2} \times \frac{2}{\pi} \cdot I_L = 0.9 V I_L \qquad (7)$$

The expression for the value of the flux $\phi$ can be obtained by substituting the total charging time $t$ for the value $T/2$ in Equation 4 and results in the following expression:

$$\phi = L I_L - 0.9 V t \qquad (8)$$

The stored energy (E) in the coil 12 is given by the expression:

$$E = \tfrac{1}{2} L I^2_L \qquad (9a)$$

By combining Equations 8 and 9$a$, an expression for the value of $t$ can be obtained as follows:

$$E = 0.45 I_L V t$$

or $$t = 2.22 \frac{E}{I_L V} \qquad (9b)$$

Substituting Equation 6 in the preceding expression for $t$ results in $$t = 3.14 \frac{E}{I_L \sqrt{Rp}} \qquad (10)$$

The entire energy consumed by a cryotron during the charging time $t$ is given by multiplying the power loss $p$ times the time $t$ and results in $$(pt) = 3.14 \frac{E}{I_L} \sqrt{\frac{p}{R}} \qquad (11)$$

If, for the purpose of the following discussion, it is assumed that the gate of a power cryotron can be built from thin film having a thickness $d$ and a width $b$ and a length $l$, and that for a per centimeter width a specific current $j$ can be carried, the entire current for the cryotron would be given by the expression:

$$I_L = jb$$

If the length of the cryotron is $l$, and the resistivity (that is in a non-superconducting condition) is $p$, then it follows that the value of R is given by the expression:

$$R = \frac{l p}{d b} \qquad (12a)$$

By substituting Equation 12$a$ in Equation 10 above, results in expression:

$$t = 3.14 \frac{E}{j} \sqrt{\frac{d}{p p b}}$$

and if the value of the surface area $A = lb$ is substituted, the expression results in :

$$t = 3.14 \frac{E}{j} \sqrt{\frac{d}{p p A}} \qquad (12b)$$

For the purpose of illustration, it will be assumed that the coil 12 will be charged with 100,000 joules, and that the maximum current $I_L = 1,000$ amperes. For the further purpose of illustration, it will be assumed that the cryotron described above can be built of lead film with the following characteristics:

$j = 200$ amps per cm.
$d = 2 \times 10^{-4}$ cm.
$p = .5 \times 10^{-6}$ ohm cm.
$A = 4,000$ sq. cm.

It is believed that a structure having the characteristics detailed above, can be contained in a volume of 500 cm$^3$. In such a structure, if during the charging a loss rate per cryotron is allowed of $p = 1$ watt, then Equation 12$b$ above yields the following results for the assumed example:

$$t = 3.14 \times \frac{10^5}{200} \times \sqrt{\frac{2 \times 10^{-4}}{1 \times .5 \times 10^{-6} \times 4,000}}$$

or $$t = 500 \text{ seconds}$$

This results in a loss for both cryotrons of a value $$2\ pt = 2 \times 1 \times 500 = 1,000 \text{ joules}$$

Comparing this loss with the value of the energy to which the coil was charged, namely 100,000 joules, results in an efficiency of $$\eta = 99\%$$

Since to evaporate one liter of helium, 2,620 joules are required, then 1,000 joules of energy will evaporate $$\frac{1,000}{2,620} = .38 \text{ liter of helium}$$

Considering this loss compared with the many liters of helium that would be required to operate a coil of the assumed dimensions, then the loss is truly quite small and represents a highly efficient system. The loss of .38 liters may become somewhat increased since the supply transformer even when operated at superconductive temperatures at 60 cycles per second, will have some losses. However, such increased losses may be kept within tolerable limits by proper design.

Since the current $I_L$ is assumed to be 1,000 amperes, Equation 9$b$ can yield the following expression for the voltage V:

$$V = \frac{2.22 E}{I_L t} = \frac{2.22 \times 10^5}{1,000 \times 500} = .44 \text{ volt}$$

The linked flux $\phi$ provided by the coil having the above assumed characteristics is provided by Equation 8 where $$\phi = L \times I_L = .9\ Vt. = .9 \times .44 \times 500 = 200 \text{ volts seconds}$$

or $$\phi = 2 \times 10^{10} \text{ maxwells}$$

If the varying electric potential supplied to the transformer has a frequency of 60 cycles per second, a charging time $t$ of 500 seconds has $500 \times 120 = 6,000$ half cycles. The flux pumped per half cycle into the coil is therefore only 1/60,000 of the coil flux $\phi$, and can be obtained from the expression for the value of $\phi$ for the assumed example, and is equal to $$\frac{\phi}{60,000} = \frac{2 \times 10^{10}}{60,000} = .33 \times 10^6 \text{ maxwells/cycle}$$

The power of the input transformer is obtained by substitution in Equation 7 as $$P_T = .9V \times I_L = .9 \times .44 \times 1,000 = 400 \text{ watts}$$

From Equation 12b, one can see that the time $t$ can be shortened by a larger current density $j$ (e.g. Nb film for the cryotron) or permitting a higher loss $p$ during charging, or selecting a larger surface area A for the cryotron.

From the foregoing description, it can be appreciated that the present invention provides new and improved electric flux pumping arrangements for supplying a circulating electric current of any desired magnitude to a superconducting lossless coil included in a superconducting lossless closed circuit. By reason of this new and improved flux pumping arrangement, heavy circulating currents through the coil for flux production stay always inside the low temperature superconducting environment where losses are substantially zero, and only small currents need be fed to the arrangement at normal room temperatures. With the arrangement, if flux pumping is stopped, a circulating current of constant magnitude is permanently frozen into the superconducting coil or other lossless component being energized. Further, only a simple phase adjustment is required, to either increase, decrease, or maintain the frozen-in circulating current at any desired value. The losses in the cryotrons during the "off" position can be kept very small. Because of these characteristics, only a small power source operating at normal room temperatures is required in order to obtain very large superconducting circulating currents, and hence large amounts of magnetic flux, if the charging time for charging the coil is long enough. In addition to the above characteristics, the nature of the flux pumping arrangement is such that if variations occur in the supply voltage supplying the arrangement, the flux pumping operation is not impaired.

Those skilled in the art will understand that various modifications and substitutions may be made in the present apparatus without departing from the spirit of this invention or the scope of the appended claims. Solid switching devices, for example, may be employed in place of relays 92 and 97 so that control circuit 81 will include no moving part and may be very small.

Figure 19:
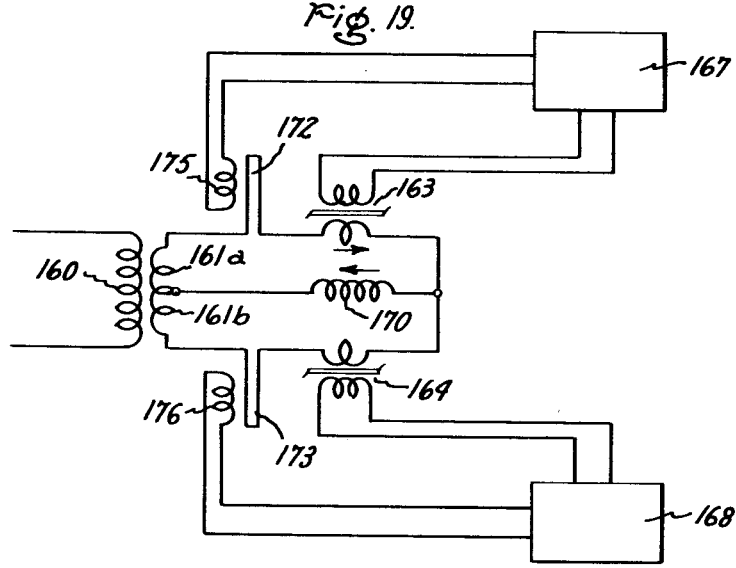
FIGURE 19 is a schematic circuit diagram of the apparatus of this invention which is similar to that of FIGURE 18 but constitutes a simplified version of the FIGURE 18 apparatus.

With reference to FIG. 19, the flux pumping apparatus illustrated is similar to that of FIG. 18 in basic structure and function, but is less complex. Thus, this equipment includes a reactor cryotron of this invention in each of two parallel secondary winding circuits across a superconductive lossless coil which is pumped from an alternating current source through the switching controls of the two reactor cryotron circuits. Again, a 10-cycle power source is coupled to transformer 160 and rectangular voltages are thereby produced at secondary winding halves 161a and 161b. Saturable reactors 163 and 164 are connected to transformer windings 161a and 161b, respectively, and are coupled to amplifiers 167 and 168, respectively.

Superconducting lossless coil 170 is connected to winding halves 161a and 161b through suitable reactors 163 and 164 and power cryotrons 172 and 173. Control coils 175 and 176 of cryotrons 172 and 173, respectively, open and close the secondary winding circuits in synchronism with the changes in current direction as explained elsewhere herein in detail.

Figure 20:
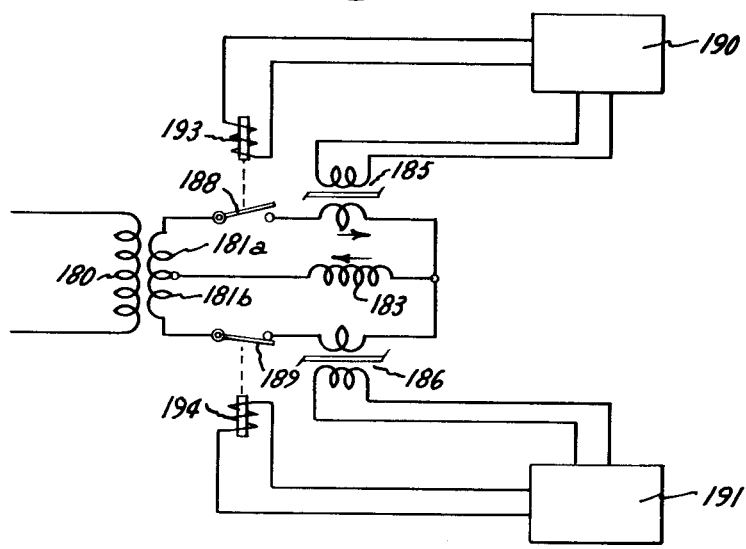
FIGURE 20 is a schematic circuit diagram of the apparatus like that of FIGURE 19 except that the switching function is performed by electromechanical switches or relays instead of cryotrons.

The FIG. 20 apparatus is quite like that of FIG. 19 with the principal exception that electromechanical switches or relays take the place of the cryotrons so that substantially higher voltages can be switched. Again, a transformer 180 is provided and is connected to a power source, suitably of 10-cycles, secondary halves 181a and 181b are connected to superconducting coil 183 through saturable reactors 185 and 186 and contact switches 188 and 189, respectively. Reactors are coupled to switches 188 and 189 through control units 190 and 191, respectively, and solenoids 193 and 194. Controllers 190 and 191 may be of any suitable conventional type, or may be the same as controllers 51 and 52 described in detail above. In any case, the operation of this apparatus will be as described above in reference to FIGS. 12, 18 and 20 except that switching will be accomplished through mechanical action and moving parts instead of by quenching and restoring the superconductive state in cryotron gate elements.

It will be understood by those skilled in the art that mechanical switching is alternative to the cryotron means described in reference to FIGS. 12, 18 and 20, the combination of the saturable reactors with each type of switching device being a general novel concept and constituting a basic element of novelty of the appended claims.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States is:

1. A flux pumping arrangement including in combination a superconducting inductance, a superconducting lossless source of varying electric potential, alternate lossless superconducting paths for operatively coupling said superconducting lossless source of varying electric potential in electric circuit relationship with said superconducting inductance, switching means operatively connected in each of said alternate superconducting paths for alternately switching said superconducting source of varying electric potential in and out of electric circuit relationship with said superconducting inductance through alternate ones of the superconducting paths in desired phase relation with the varying electric potential supplied from said superconducting source, and control circuit means operatively coupled to said source of varying electric potential, each of said superconducting paths, and each of said switching means for effectively controlling the operation of said switching means in desired phase relation with respect to the varying electric potential.

2. A flux pumping arrangement as described in claim 1 in which the switching means comprises a power cryotron operatively connected in each of said alternate superconducting paths and in which the control means is operatively connected to each of the power cryotrons.

3. A flux pumping arrangement as described in claim 1 in which the control means includes a superconducting saturable reactor operatively connected in each of the alternate superconducting lossless paths.

4. A flux pumping arrangement as described in claim 1 in which the switching means comprises a mechanical switch operatively connected in each of the alternate superconducting lossless paths and in which the control means includes a saturable reactor operatively associated with each said mechanical switch.

5. A flux pumping arrangement including in combination a superconducting lossless component, a superconducting lossless source of varying electric potential in superconducting lossless connection to said component, alternate lossless superconducting paths for operatively coupling said superconducting lossless source of varying electric potential in electric circuit relationship with said superconducting lossless component, first switching means operatively connected in one of said alternate lossless superconducting paths for operatively connecting the lossless source of varying electric potential across the lossless superconducting component through the one superconducting path upon the varying electric potential measured with respect to the one superconducting path attaining a predetermined phase relation whereby current is induced to flow through the one superconducting path and through the lossless component in a given direction, alternate switching means operatively connected in an alternate one of said lossless superconducting paths for alternately connecting the lossless source of varying electric potential across the lossless superconducting component through the alternate lossless superconducting path upon the varying electric potential from the lossless source measured with respect to the alternate superconducting path attaining a predetermined phase relation relative to the potential measured with respect to the one superconducting path whereby current is induced to flow through the alternate superconducting path and through the lossless component in the same given direction, said first switching means also serving to alternately disconnect the one superconducting path from the lossless superconducting component upon the connection of the alternate superconducting path to that component, such disconnection being substantially simultaneous with the reversal of current flow through such one superconducting path, and said alternate switching means also serving to effectively disconnect the alternate superconducting path from the lossless superconducting component upon the alternate connection by the first switching means of the one superconducting path to the lossless component upon the varying electric potential measured with respect to the one superconducting path attaining a predetermined phase relation relative to the potential measured with respect to the alternate superconducting path, such effective disconnection being substantially simultaneous with the reversal of current flow through such alternate superconducting path.

6. Electrical apparatus comprising a circuit including a load, a cryotron for controlling current flow through the circuit to the load, a control coil for the cryotron, switch means for connecting the control coil to a power source, a saturable reactor in the said circuit and operatively coupled to the switch means for actuating the switch means in response to alternating current signals, and means adapted to connect the circuit to an alternating current power source.

7. Electrical apparatus comprising a superconducting component, a power cryotron in electric connection to said component, a cryotron control coil, first means including a half-wave rectifier circuit for operatively connecting the control coil to a direct current power source, and second means adapted to connect the first means to an alternating current power source.

References Cited

UNITED STATES PATENTS

| | | | |
|---|---|---|---|
| 2,666,884 | 1/1954 | Ericsson et al. | 321—45 |
| 2,762,008 | 9/1956 | Gordon | 321—48 X |
| 3,088,040 | 4/1963 | Newhouse | 307—88.5 |
| 3,098,189 | 7/1963 | Buchhold | 321—8 |
| 3,271,628 | 9/1966 | Prior | 317—123 |

OTHER REFERENCES

Review of Scientific Instruments, June 1958, vol. 29, No. 6, pp. 537–8.

JOHN F. COUCH, *Primary Examiner.*

W. H. BEHA, *Assistant Examiner.*